United States Patent [19]

Nagano

[11] Patent Number: 5,044,213

[45] Date of Patent: Sep. 3, 1991

[54] SPEED CONTROL APPARATUS FOR A BICYCLE

[75] Inventor: Masashi Nagano, Izumi, Japan

[73] Assignee: Shimano Industrial Co., Ltd., Osaka, Japan

[21] Appl. No.: 441,252

[22] Filed: Nov. 27, 1989

[30] Foreign Application Priority Data

Nov. 29, 1988 [JP] Japan .................. 63-303424
Nov. 29, 1988 [JP] Japan .................. 63-303425
Nov. 29, 1988 [JP] Japan .................. 63-303426
Apr. 11, 1989 [JP] Japan ...................... 1-91226

[51] Int. Cl.$^5$ .................. F16H 27/02; B60K 20/00
[52] U.S. Cl. .......................... 74/142; 74/475; 74/502.2
[58] Field of Search ............ 74/142, 475, 501 B, 74/502.2

[56] References Cited

U.S. PATENT DOCUMENTS

| | | | |
|---|---|---|---|
| 3,945,477 | 3/1976 | Macher et al. | 74/142 X |
| 4,232,564 | 11/1980 | Yamasaki | 74/474 |
| 4,658,667 | 4/1987 | Schuller | 74/475 |
| 4,864,885 | 9/1989 | Nagano | 74/142 X |
| 4,876,913 | 10/1989 | Romano | 74/535 |

FOREIGN PATENT DOCUMENTS

| | | |
|---|---|---|
| A0371254 | 6/1990 | European Pat. Off. |
| 1195568 | 6/1965 | Fed. Rep. of Germany ........ 74/142 |
| 52-32800 | 3/1977 | Japan .................. 74/142 |
| A2012893 | 1/1979 | United Kingdom . |

OTHER PUBLICATIONS

EP 89—12—1848, European Search Report

*Primary Examiner*—Allan D. Herrmann
*Assistant Examiner*—David W. Laub
*Attorney, Agent, or Firm*—Dickstein, Shapiro & Morin

[57] ABSTRACT

A bicycle speed control apparatus according to this invention comprises a take-up element for winding up a speed control cable, the take-up element being urged in a cable unwinding direction, a wind-up control member for rotating the take-up element in a cable winding direction, a position maintaining mechanism including a first engaging member and a first engaging portion engageable stepwise for maintaining the take-up element in a selected position, a rotation limiting mechanism including a second engaging member and a second engaging portion engageable stepwise for limiting rotation in the unwinding direction of the take-up element to a predetermined amount, and an unwind control member operable to effect a change speed by actuating the rotation limiting mechanism and releasing the take-up element from the position maintaining mechanism for unwinding the cable.

The first engaging member of the position maintaining mechanism and the second engaging member of the rotation limiting mechanism are movable independently of each other. The apparatus thereby achieves improved durability and relaxation of the requirement for manufacturing dimensional precision.

16 Claims, 14 Drawing Sheets

SPEED CONTROL APPARATUS FOR A BICYCLE

BACKGROUND OF THE INVENTION (1) Field of the Invention

The present invention relates to a speed control apparatus for a bicycle. More particularly, the invention relates to a speed control apparatus for a bicycle comprising a fixed member, a take-up element for winding up a speed control cable, the take-up element being rotatably supported by the fixed member and urged in a cable unwinding direction, a wind-up control member operable to effect a change speed by rotating the take-up element against the urging force in the unwinding direction for winding up the cable, a position maintaining mechanism including a first engaging member and a first engaging portion engageable stepwise for maintaining the take-up element in a selected position, a rotation limiting mechanism including a second engaging member and a second engaging portion engageable stepwise for limiting rotation in the unwinding direction of the take-up element to a predetermined amount, and an unwind control member operable to effect a change speed by actuating the rotation limiting mechanism and releasing the take-up element from the position maintaining mechanism for unwinding the cable.

(2) Description of the Prior Art

A bicycle speed control apparatus as noted above is disclosed in U.K. patent publication GB-8432714 (Japanese Patent Publication Kokai No. 61-222884), for example. It is proposed in this prior publication to provide a rotation limiting mechanism for preventing the take-up element from rotating in the cable unwinding direction to the full extent due to the tension of the cable when the wind-up control member is operated to release the take-up element from the position maintaining mechanism. Specifically, the disk-shaped take-up element has top and bottom surfaces on which an engaging portion of the position maintaining mechanism and an engaging portion of the rotation limiting mechanism are formed as displaced a half pitch from each other. Pawls of the position maintaining mechanism and rotation limiting mechanism are formed integrally with upper and lower portions of an unwind control button urged axially upwardly of the take-up element. These pawls are opposed to the engaging portions, respectively.

However, since the pawls of the position maintaining mechanism and rotation limiting mechanism are formed integrally with the unwind control button according to the above known construction, these pawls are movable simultaneously with a pressing operation of the control button. Therefore, if the spacing between tips of the two pawls should become smaller than a predetermined value, the take-up element might be engaged by neither pawl during the operation of the control button. Then the take-up element would rotate continuously in the cable unwinding direction, thereby making change speed in the unwinding direction impossible.

The two pawls tend to wear to the extent to produce the above non-engagement state in a short period of time as a result of frequent change speed operations. It is thus difficult to promote durability of the speed control apparatus. In manufacture, it is necessary to set the spacing between the tips of the two pawls and the thickness of the take-up element with high precision. The requirement for strict dimensional precision tends to increase the manufacturing cost.

SUMMARY OF THE INVENTION

An object of the present invention is to provide a speed control apparatus for a bicycle capable of positively maintaining the stepwise rotation in the cable unwinding direction of the take-up element even if change speed operations are carried out frequently and under severe conditions and even if there occur slight dimensional errors in manufacture.

In order to achieve the above object, a bicycle speed control apparatus according to the present invention comprises a fixed member, a take-up element for winding up a speed control cable, the take-up element being rotatably supported by the fixed member and urged in a cable unwinding direction, a wind-up control member operable to effect a change speed by rotating the take-up element against the urging force in the unwinding direction for winding up the cable, a position maintaining mechanism including a first engaging member and a first engaging portion engageable stepwise for maintaining the take-up element in a selected position, a rotation limiting mechanism including a second engaging member and a second engaging portion engageable stepwise for limiting rotation in the unwinding direction of the take-up element to a predetermined amount, and an unwind control member operable to effect a change speed by actuating the rotation limiting mechanism and releasing the take-up element from the position maintaining mechanism for unwinding the cable, characterized in that the first engaging member of the position maintaining mechanism and the second engaging member of the rotation limiting mechanism are movable independently of each other.

With the above construction, the first engaging member of the position maintaining mechanism and the second engaging member of the rotation limiting mechanism are movable independently of each other. Therefore, the position maintaining mechanism and rotation limiting mechanism may be designed in an optimal way independently of each other, so that the first engaging member need not start moving away from the first engaging portion when the second engaging member starts moving toward the second engaging portion with an operation of the unwind control member. In other words, dimensional errors of both the position maintaining mechanism and rotation limiting mechanism may be diminished en bloc by differentiating movement starting timings of the first and second engaging members. Therefore, even if there are slight manufacturing dimensional errors in the position maintaining mechanism and rotation limiting mechanism, these errors do not directly result in a non-engagement state in which the first and second engaging portions remain disengaged from the first and second engaging members. This fact means at the same time that the non-engagement state will not readily occur even when the first and second engaging members have somewhat become worn.

With the bicycle speed control apparatus according to the present invention, therefore, the stepwise rotation in the cable unwinding direction of the take-up element is maintained positively even if change speed operations are carried out frequently and under severe conditions and even if there occur slight dimensional errors in manufacture.

In working the present invention, a first and a second camming devices may be operatively connected to the unwind control member so that the first engaging member is separated and disengaged from the first engaging portion of the position maintaining mechanism after moving the second engaging member to a position engageable with the second engaging portion of the rotation limiting mechanism.

With this construction, dimensional errors of the position maintaining mechanism and rotation limiting mechanism are diminished by differentiating operating timings of the first and second camming devices.

Other objects, features and advantages of the present invention will be apparent from the following description of the preferred embodiments.

BRIEF DESCRIPTION OF THE DRAWINGS

FIGS. 1 through 3 show a change speed lever apparatus according to a first embodiment of the present invention, in which:

FIG. 1 is an enlarged partial view in section of the lever apparatus,

FIG. 2 is a partial view in cross section of the lever apparatus, and

FIG. 3 is an explanatory view showing an operating state.

FIGS. 4 through 11 show a second embodiment of the invention, in which:

FIG. 4 is an enlarged sectional view similar to FIG. 1,

FIG. 5 is a reduced sectional view taken on line 5—5 of FIG. 4,

FIG. 6 is a reduced sectional view taken on line 6—6 of FIG. 4,

FIG. 7 is a reduced sectional view taken on line 7—7 of FIG. 4,

FIG. 8 is an explanatory view showing a take-up element in an initial position,

FIG. 9 is an explanatory view showing the take-up element in a selected speed position, FIG. 10 is an explanatory view showing the take-up element in return movement, and FIG. 11 is an explanatory view showing a feed pawl and a first engaging member in a disengaged state.

FIGS. 12 through 25 show a third embodiment of the invention, in which:

FIG. 12 is an enlarged partial plan view in cross section,

FIG. 13 is a reduced partial view in vertical section,

FIG. 14 is a reduced partial side view in vertical section,

FIG. 15 is an enlarged fragmentary view in section of a transmission element,

FIG. 16 is an enlarged sectional view of a rotation limiting mechanism,

FIGS. 17 and 18 are explanatory views showing operating states, respectively,

FIG. 19 is a perspective view of the entire apparatus,

FIG. 20 is a sectional view of a change speed lever,

FIG. 21 is a section taken on line 21—21, FIG. 20

FIG. 22 is a front view of a retaining element,

FIG. 23 is a rear view of a release button,

FIG. 24 is a rear view of a seat having limiting projections, and

FIG. 25 is a side view of the seat.

FIG. 26 is a schematic view in cross section of a principal portion showing a modification of the first embodiment.

DETAILED DESCRIPTION OF THE PREFERRED EMBODIMENTS

Figure 3:
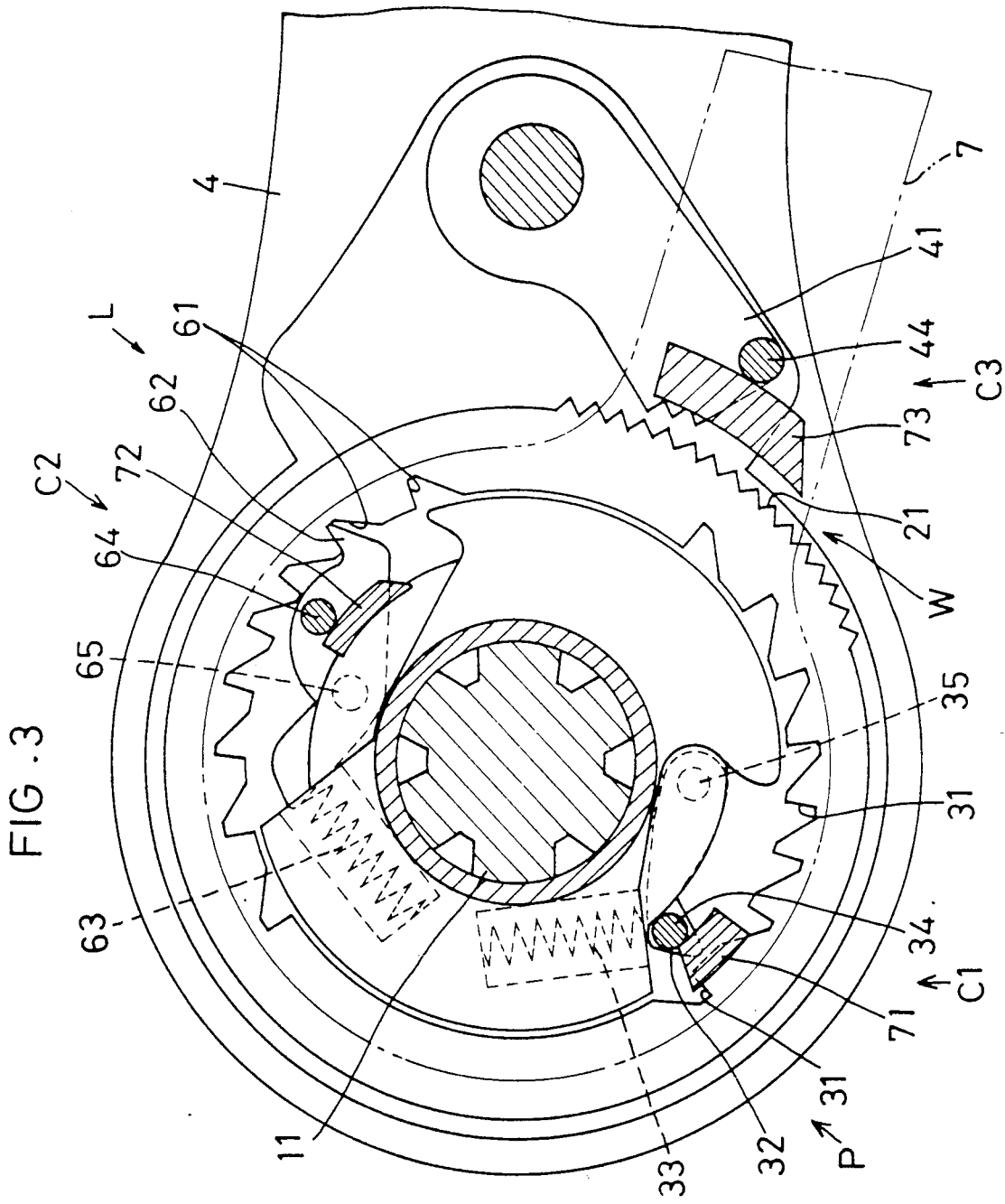

A first embodiment of the present invention will be described first with reference to FIGS. 1 through 3.

Figure 1:
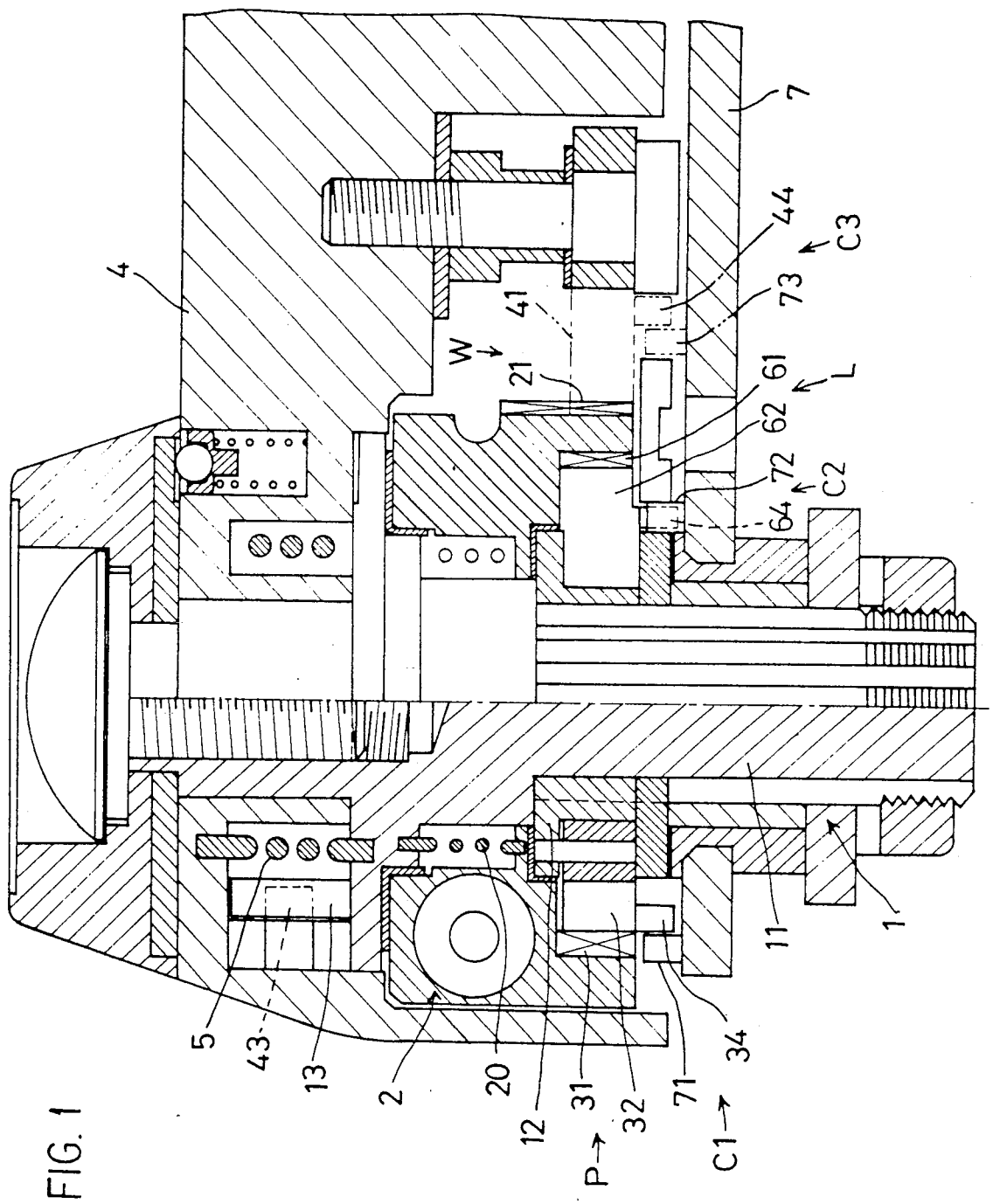

In FIG. 1, reference numeral 1 indicates a fixed member attached to a handlebar (not shown) for supporting other components of the speed control apparatus. The fixed member 1 includes a support shaft 11 extending perpendicular to the handlebar. The support shaft 11 pivotally supports a take-up element 2 for winding a control wire, a change speed lever 4 for controlling the take-up element 2 to wind up the wire, and a release lever 7 for causing a wire unwinding action. Specifically, a braking apparatus comprises a bracket fixed to a curved portion of a dropped handlebar of a bicycle, and a brake lever pivoted to the bracket, wherein the brake lever is divided into a base portion and a distal portion. The base portion corresponds to the fixed member 1, whereas the distal portion corresponds to the change speed lever 4. The support shaft 11 extends perpendicular to a lever shaft which pivotally connects the brake lever to the bracket. At a braking time the brake lever is swung about the lever shaft, and for a change speed operation the change speed lever 4 is swung about the support shaft 11 in a direction perpendicular to the swinging direction of the brake lever.

The speed control apparatus of this invention is attached to a position of the handlebar adjacent a handgrip, with the support shaft 11 extending downwardly therefrom. This arrangement allows the rider to operate the change speed lever 4 and release lever 7 with the thumb of the hand holding the handgrip. The change speed lever 4 is operable to rotate the take-up element 2 in a direction to wind up the wire, while the release lever 7 is operable to rotate the take-up element 2 in a direction for allowing the wire to be rewound.

The take-up element 2 is maintained by a position maintaining mechanism P in a position to which the take-up element 2 is rotated, the rotation in the unwinding direction of the take-up element 2 being limited to a predetermined amount by a rotation limiting mechanism L. As will be described later, a one-way mechanism W is provided between the change speed lever 4 and take-up element 2 for separating an initial position of the change speed lever 4 and rotational positions of the take-up element 2, to improve operability of the change speed lever 4. Further, as described later, the position maintaining mechanism P includes a first engaging member 32 and a first engaging portion 31 which are engageable stepwise, while the rotation limiting mechanism L includes a second engaging member 62 and a second engaging portion 61 also engageable stepwise. The first and second engaging members are pivotably supported on pawl axes 35 and 65 extending substantially parallel to the support shaft 11, respectively.

The take-up element 2 is supported on a longitudinally intermediate position of the support shaft 11, and defines a plurality of feed teeth 21 arranged at a small pitch along an outer periphery thereof, which feed teeth 21 constitute part of the one-way mechanism W. The take-up element 2 further defines the first engaging portion 31 and second engaging portion 61, each comprising a plurality of teeth arranged along inner peripheries thereof.

The change speed lever 4 is pivotably supported on a distal position of the support shaft 11, while the release lever 7 is pivotably supported on a proximal position of the support shaft 11. The support shaft 11 further supports a holder sleeve 12 which is unrotatable relative to the support shaft 11. The holder sleeve 12 pivotally supports the first engaging member 32 and second engaging member 62 both having a pawl-like shape. The first engaging member 32 is urged toward the first engaging portion 31 by a spring 33, while the second engaging member 62 is urged away from the second engaging member 61 by a spring 63. The support shaft 11 includes a setter 13 at an intermediate position thereof for setting the change speed lever 4 to the initial position. The change speed lever 4, on the other hand, includes a contact portion 43 for contacting the setter 13.

The one-way mechanism W further includes a feed pawl 41 pivotally supported on the change speed lever 4 to engage with the feed teeth 21 for transmitting an operating force acting in the wire-winding direction of the change speed lever 4 to the take-up element 2, and a spring (not shown) for urging the feed pawl 41 toward the feed teeth 21.

The release lever 7 includes a proximal portion defining a bore for fitting to the support shaft 11, and a lever portion extending outwardly from the proximal portion. The release lever 7 is urged to return to the initial position by an urging device not shown. Part of the release lever 7 is contactable with part of the change speed lever 4 for setting the return position. Through a first to a third camming devices C1-C3, the release lever 7 operates and cancels the position maintaining mechanism P, rotation limiting mechanism L and one-way mechanism W. The first to third camming devices C1-C3 include drive elements comprising a first to a third cams 71-73 projecting axially of the support shaft 11 from the proximal portion of the release lever 7, respectively. Driven elements of the camming devices C1-C3 comprise a first to a third cam followers 34, 64 and 44 projecting axially of the support shaft 11 from upper surfaces of the first and second engaging members 32 and 62 and feed pawl 41, respectively. With a swinging movement of the release lever 7, the third camming device C3 first moves the feed pawl 41 away from the feed teeth 21, then the second camming device C2 pushes the second engaging member 62 to a position for engaging the second engaging portion 61, and finally the first camming device C1 moves the first engaging member 32 away from the first engaging portion 31.

An operation of the bicycle control apparatus as constructed above will be described next.

Figures 2, 26:
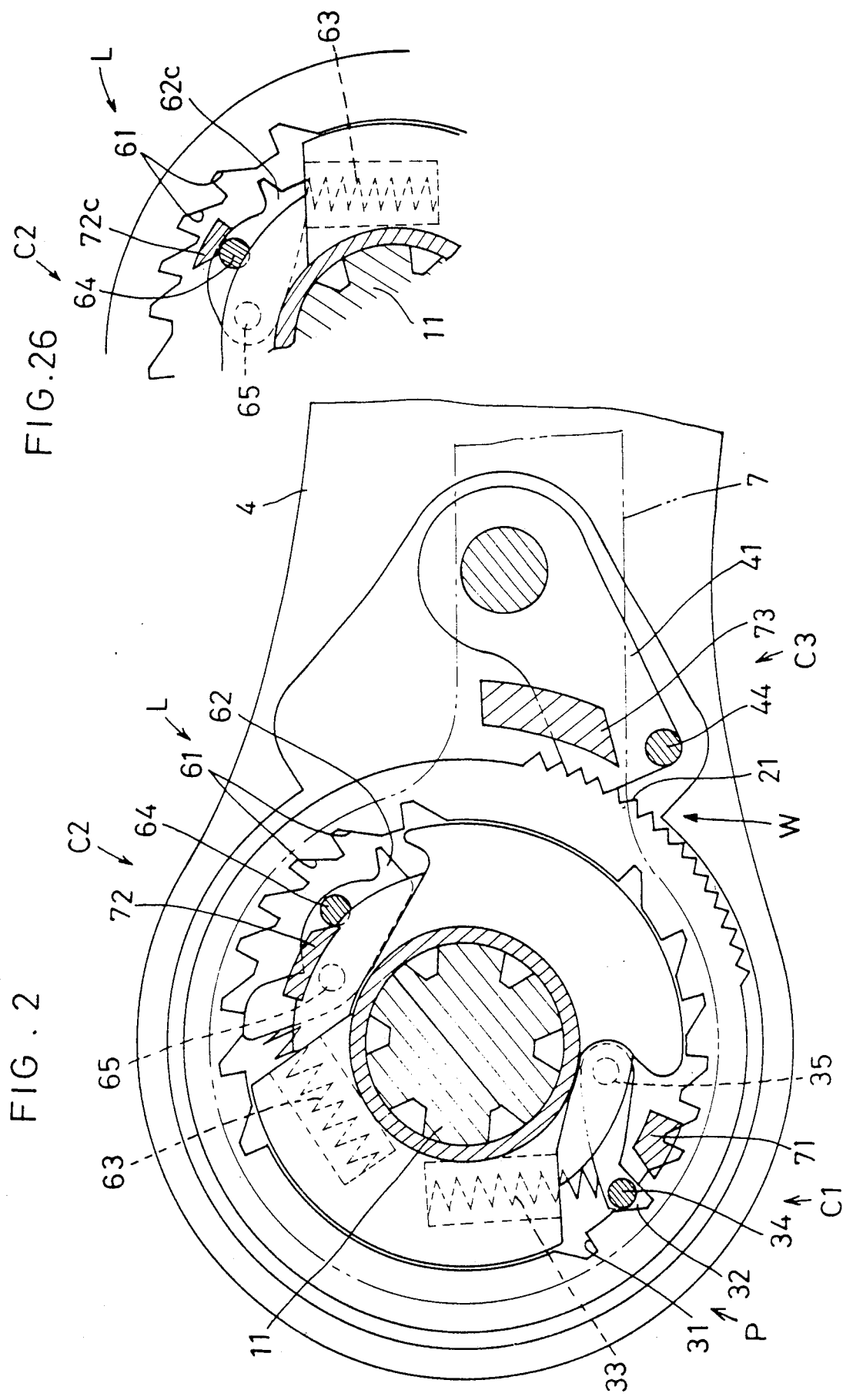

When the change speed lever 4 is swung forward in the clockwise direction in FIG. 2 with the thumb of a hand holding a handlebar grip, the take-up element 2 rotates forward under a force applied through the feed pawl 41, and the first engaging member 32 disengages from the first engaging portion 31, thereby pulling the control wire. At this time, a first speed is provided when the forward swing of the change speed lever 4 moves the engaging portion 31 by a one-pitch stroke, and a second speed is provided when the engaging portion 31 is moved by a two-pitch stroke. A single operation effected by the thumb can produce straight up to a third speed. For a fourth and higher speeds, the change speed lever 4 is once returned to the initial position and swung forward again to produce a higher speed step by step or to change to a speed plural steps higher in one effort. When a desired large gear is reached, the first engaging member 32 is placed in engagement with the first engaging portion 31 to lock the take-up element 2 against backward rotation, thereby positively maintaining the desired speed by the large gear. When the change speed lever 4 is released after the above change speed operation, the lever 4 returns (counterclockwise in FIG. 2) under the force of a lever spring 5 to the initial position with the contacting portion 43 in contact with the setter 13, to be ready for a next operation.

Where a total of five or six speeds are provided, according to the above construction, a shift is readily made from a smaller gear to a larger gear by pushing the change speed lever 4 twice with the thumb.

When causing a shift from a larger gear to a smaller gear, the thumb of the hand holding the grip is placed on the lever portion of the release lever 7 in the initial position. Then the release lever 7 is swung forward in the clockwise direction in FIG. 2, i.e. in the same direction as the change speed lever 4 was swung. As a result, the third cam 73 first contacts the third cam follower 44 of the feed pawl, the second cam 72 contacts the second cam follower 64 of the first engaging member next, and finally the first cam 71 contacts the first cam follower 34 of the first engaging member. The contact between the third cam 73 and third cam follower 44 disengages the feed pawl 41 from the feed teeth 21. The contact between the second cam 72 and second cam follower 63 presses the second engaging member 62 toward the second engaging portion 61. After the second engaging member 62 moves into engagement with the second engaging portion 61, the contact between the first cam 71 and first cam follower 33 disengages the first engaging member 32 from the first engaging portion 31. As a result, the take-up element 2 rotates counterclockwise by an amount corresponding to a gap between the second engaging member 62 and second engaging portion 61, i.e. within a range of one pitch of the first engaging portion 31. When the release lever 7 returns counterclockwise upon release, the second engaging member 62 is freed from the pressing force and disengages from the second engaging portion 61, and the first engaging member 32 engages a position of the first engaging portion 31 corresponding to a next smaller gear. This engagement prevents return rotation of the take-up element 2 under the force of a spring 20, thereby positively maintaining a change speed position shifted to the the smaller gear by one pitch of the first engaging portion 31. The release lever 7 having returned stops at the initial position through contact with part of the change speed lever 4, to be ready for a next operation.

A second embodiment of the present invention will be described next with reference to FIGS. 4 through 11.

Figure 4:
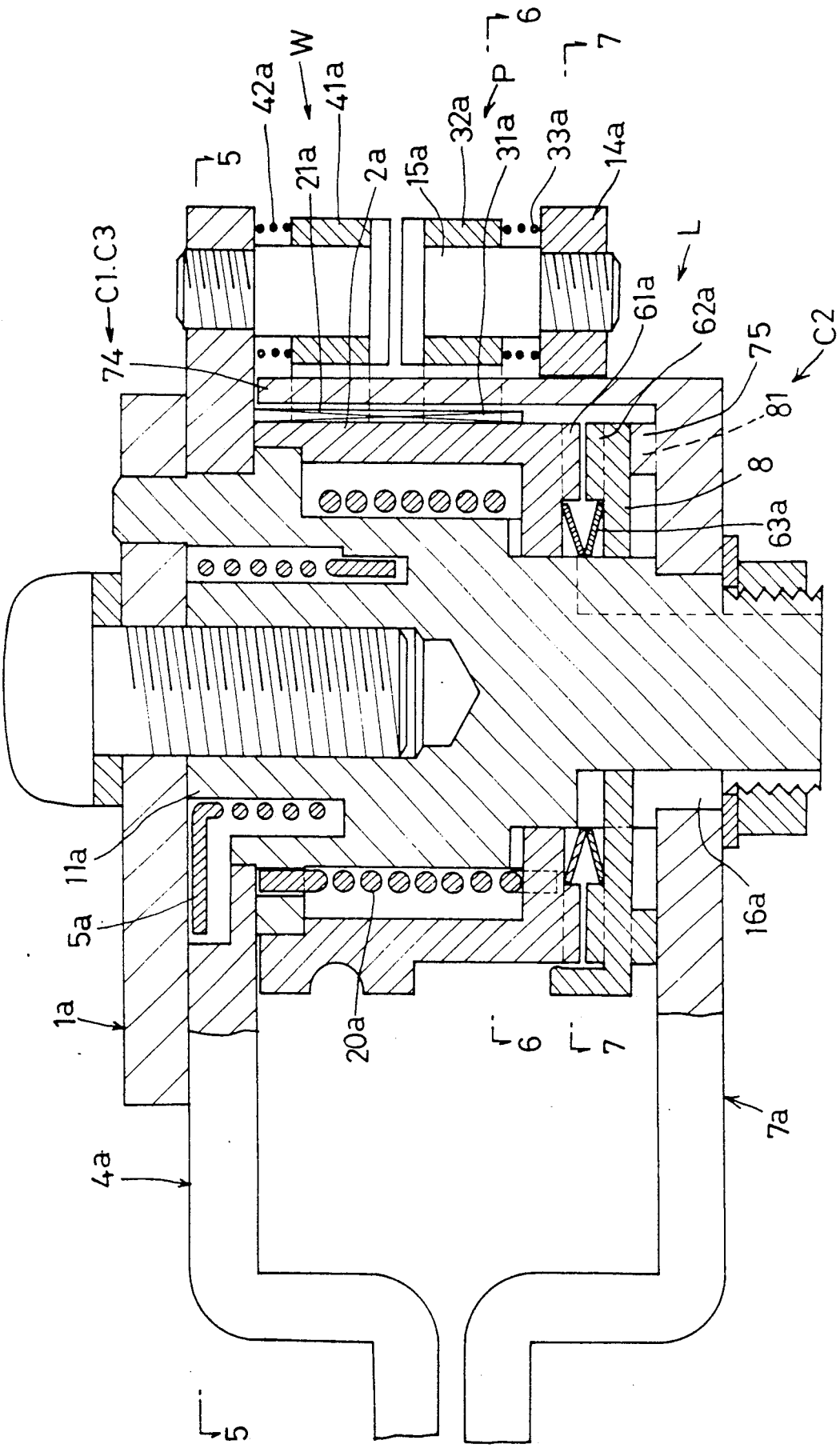

As shown in FIG. 4, a fixed member 1a includes a base member and a support shaft 11a attached to the base member. The support shaft 11a defines a plurality of axial grooves 16a and a threaded groove on outer peripheries at a distal end thereof. A nut is meshed with the threaded groove. The fixed member 1a includes a projecting piece 14a for supporting a pawl axis 15a extending parallel to the support shaft 11a. The pawl axis 15a pivotally supports a pawl-like first engaging member 32a urged by a spring 33a toward a first engaging portion 31a described later. These components constitute part of a position maintaining mechanism P.

Figure 5:
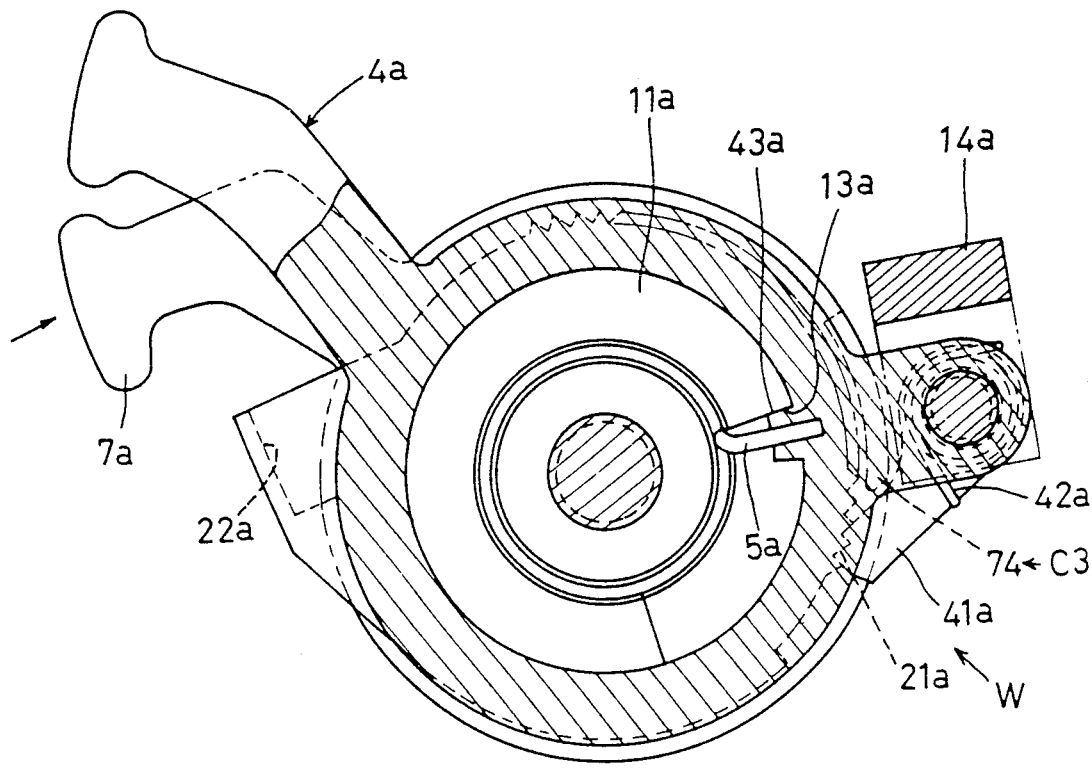

The support shaft 11a rotatably or pivotally supports a wire take-up element 2a, a change speed lever 4a, and a release lever 7a. The support shaft 11a further supports a rotation limiting plate 8, which will be described later, swingably and axially movably fitted in the grooves 16a and opposed to a base portion of the release lever 7a. As shown in FIG. 5, a setter 13a and a contact portion 43a are provided between the support shaft 11a and an inside wall of an axial bore of the change speed lever 4a for stopping the change speed lever 4a at an initial position. A lever spring 5a is provided for urging the change speed lever 4a toward the initial position.

As shown in FIG. 4, the take-up element 2a is urged in a wire-unwinding direction by a return spring 20a, while the change speed lever 4a is urged toward the initial position by the lever spring 5a. The rotation limiting plate 8 is urged away from the take-up element 2a by a spring 63a mounted on the support shaft 11a.

Figure 6:
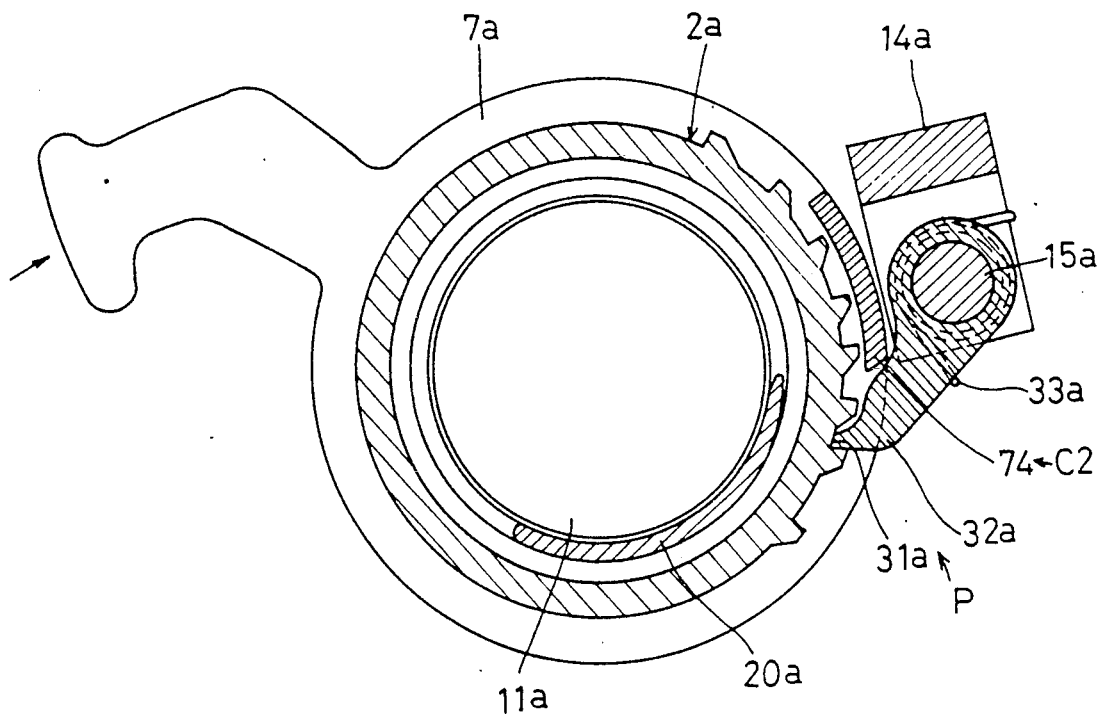

As shown in FIGS. 4 through 6, the take-up element 2a defines a plurality of feed teeth 21a, and the first engaging portion 31a comprising a plurality of teeth arranged along an outer periphery thereof. The take-up element 2 further defines a second engaging portion 61a comprising a plurality of teeth arranged on one axial end thereof. The feed teeth 21a and first engaging portion 31a are displaced axially of the take-up element 2a.

As shown in FIGS. 4 and 5, the change speed lever 4a pivotally supports, at a base portion thereof, a feed pawl 41a urged toward the feed teeth 21a by a spring 42a. These components constitutes a one-way mechanism W. Reference numeral 22a indicates an engaging portion of the take-up element 2a for engaging one end of a wire.

As shown in FIGS. 4 through 6, the release lever 7a includes a control projection 74 extending from the base portion thereof parallel to the support shaft 11a to act as the first and third cams. The control projection 74 is disposed between the feed pawl 41a and first engaging member 32a, and the feed teeth 21a and first engaging portion 31a. Specifically, with a swing of the release lever 7a in the same direction as the wire-winding direction causes the control projection 74 to contact the feed pawl 41a and first engaging member 32a. As a result, the feed pawl 41a and first engaging member 32a which themselves act as a first and a third cam followers move away from the feed teeth 21a and first engaging portion 31a, respectively.

Figure 7:
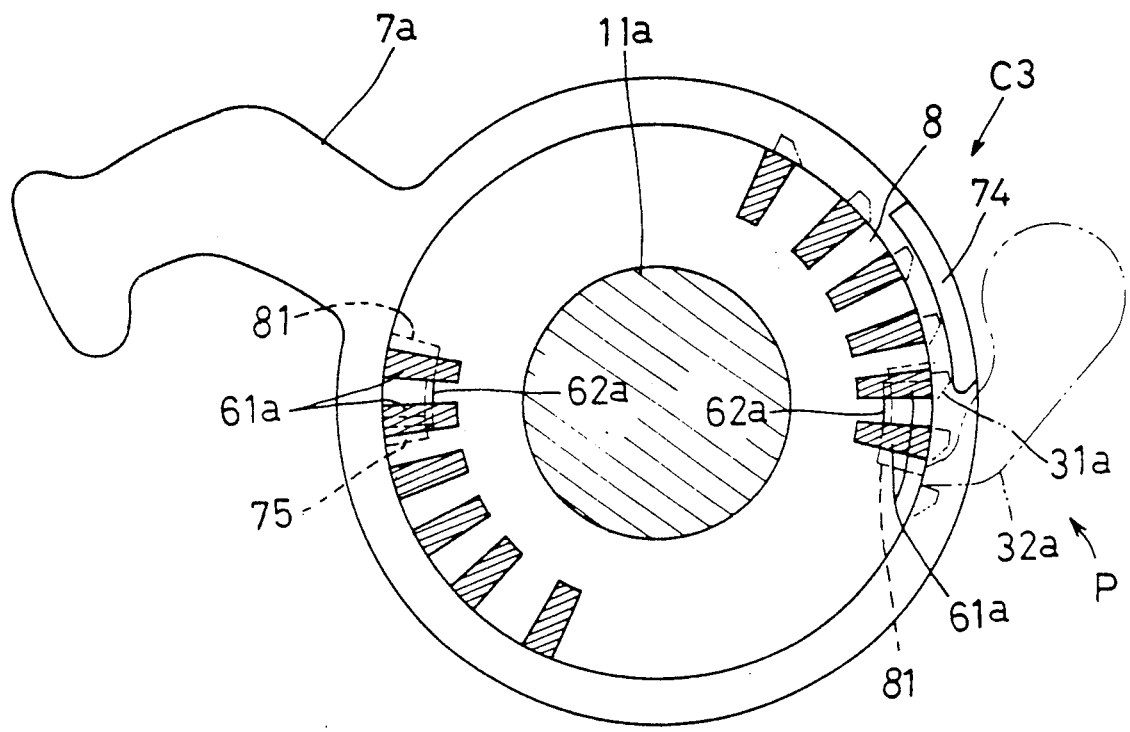
Figure 8:
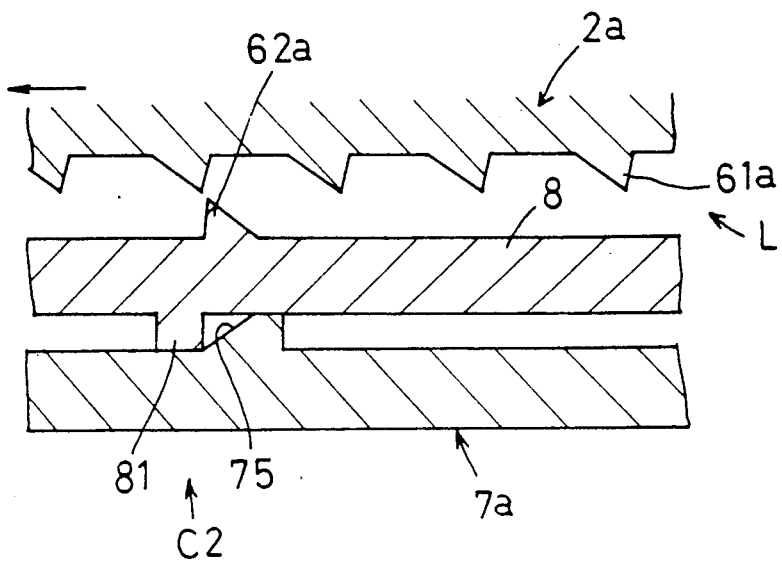

As shown in FIGS. 4, 7 and 8, a second camming device C2 includes a cam surface 75 and a cam follower 81 projecting from opposed surfaces of the release lever 7a and rotation limiting plate 8, respectively. Further, a rotation limiting mechanism L includes the second engaging portion 61a comprising a plurality of teeth defined on a bottom surface of the take-up element 2a, and a second engaging member 62a defined on a surface of the rotation limiting plate 8 opposed to the take-up element 2a for engaging the second engaging portion 61a when the release lever 7a is swung. The rotation limiting plate 8 is urged away from the take-up element 2a by the spring 63a as noted hereinbefore. When the release lever 7a is swung in the same direction as the wire-winding direction, the rotation limiting plate 8 is moved toward the take-up element 2a by the action of the cam surface 75 and second cam follower 81, whereby the second engaging member 62a moves into a locus of movement of the second engaging portion 61a. Thus, the spring 63a is also used for imparting a force through the cam surface 75 to the release lever 7a to return the latter in the wire-unwinding direction. As will be apparent from the description of the operation given hereinafter, the control projection 74 and cam surface 75 are arranged to move the feed pawl 41a and first engaging member 32a in a disengaging direction after moving the second engaging member 62a in the engaging direction with a swing of the release lever 7a. Although FIG. 7 shows two sets of the second engaging member 62a, second cam follower 81 and cam surface 75, one set may be sufficient.

The speed control apparatus as constructed above according to the second embodiment of this invention, as in the first embodiment, is desirably secured to to a position of the handlebar (not shown) adjacent a handgrip, with the support shaft 11a extending downwardly therefrom. This arrangement allows the rider to operate the change speed lever 4a and release lever 7a with the thumb of the hand holding the handgrip.

An operation of the bicycle control apparatus as constructed above according to the second embodiment will be described next.

Figure 11:
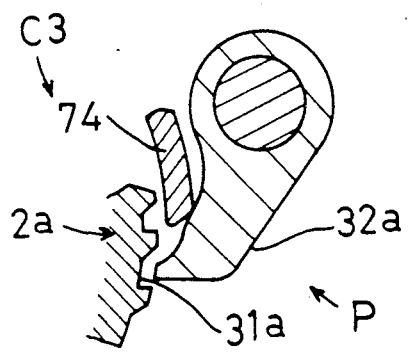

When the change speed lever 4a is swung in the wire-winding (clockwise) direction in FIG. 5 with the thumb of a hand holding the handlebar grip, the take-up element 2a rotates clockwise under a force applied from the change speed lever 4a through the feed pawl 41a of the one-way mechanism W, and the first engaging member 32a disengages from the first engaging portion 31a as shown in FIG. 11. At this time, the control wire is pulled, and a desired speed is provided when the forward swing of the change speed lever 4a moves the engaging portion 31a by a one-pitch stroke or more. When the desired speed position is reached, the first engaging member 32a is placed in engagement with the first engaging portion 31a to lock the take-up element 2a against backward rotation, thereby positively maintaining the desired speed.

When the change speed lever 4a is released after the above change speed operation, the lever 4a returns (counterclockwise in FIG. 5) under the force of lever spring 5a to the initial position shown in FIG. 5, with the contacting portion 43a in contact with the setter 13a, to be ready for a next operation.

Figure 9:
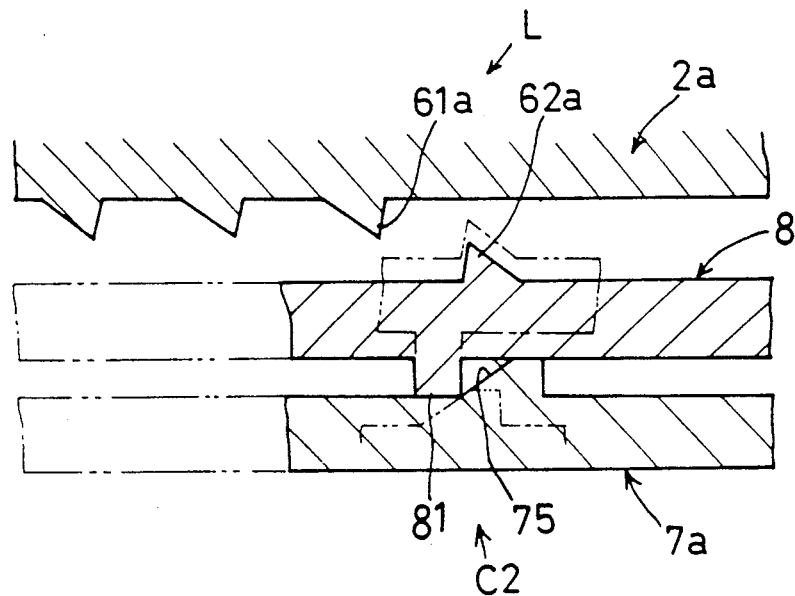
Figure 10:
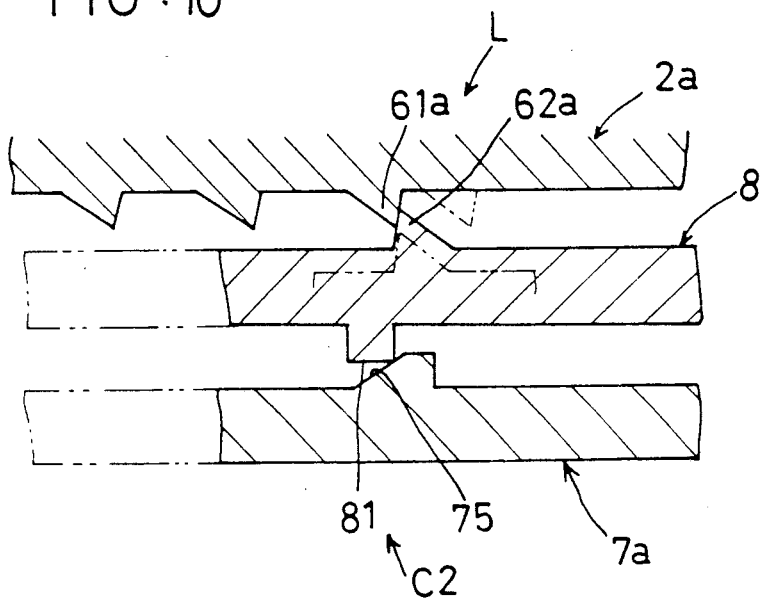

When causing a shift in a direction opposite to the above, the thumb of the hand holding the grip is placed on the lever portion of the release lever 7a. Then the release lever 7a may be just pushed in the direction indicated by arrows in FIGS. 5 and 6. As a result, the release lever 7a slightly swings clockwise, whereby the rotation limiting plate 8 moves toward the take-up element 2a by the action of the cam surface 75 of the second camming device C2, to cause the second engaging member 62a to advance into the locus of movement of the second engaging portion 61a on the take-up element 2a as shown in FIGS. 9 and 10. Subsequently, the control projection 74 contacts the feed pawl 41a and first engaging member 32a to move them away and out of mutual engagement. Consequently, the take-up element 2a returns counterclockwise, under the force of return spring 20a, by an amount corresponding to a gap between the second engaging member 62a and second engaging portion 61a, i.e. within a range of one pitch of the first engaging portion 31a.

When the release lever 7a returns counterclockwise upon release, the rotation limiting plate 8 is freed from the pressing force, thereby disengaging the second engaging member 62a from the second engaging portion 61a. At the same time the first engaging member 32a engages a position of the first engaging portion 31a corresponding to a next smaller gear. This engagement prevents return rotation of the take-up element 2a under the force of return spring 20a, thereby positively maintaining a change speed position shifted to the the smaller gear.

According to the first and second embodiments as described above, the operations of the position maintaining mechanism P and rotation limiting mechanism L may be timed for actuating the first and second camming devices C1 and C2 when the release lever 7 is swung to an appropriate position. That is, the position maintaining mechanism P and rotation limiting mechanism L are not operable gradually with a swing of the release lever 7, but are operable by a sufficient amount to become engaged or disengaged when the release lever 7 reaches a certain position. Consequently, even if the position maintaining mechanism P and rotation limiting mechanism L have low dimensional precision, there is little possibility of danger resulting from the first and second engaging members of these mechanisms totally failing to engage the first and second engaging portions, and a shift may be effected stepwise in the unwinding direction.

A third embodiment of the invention will be described next with reference to FIGS. 12 through 25.

Figure 12:
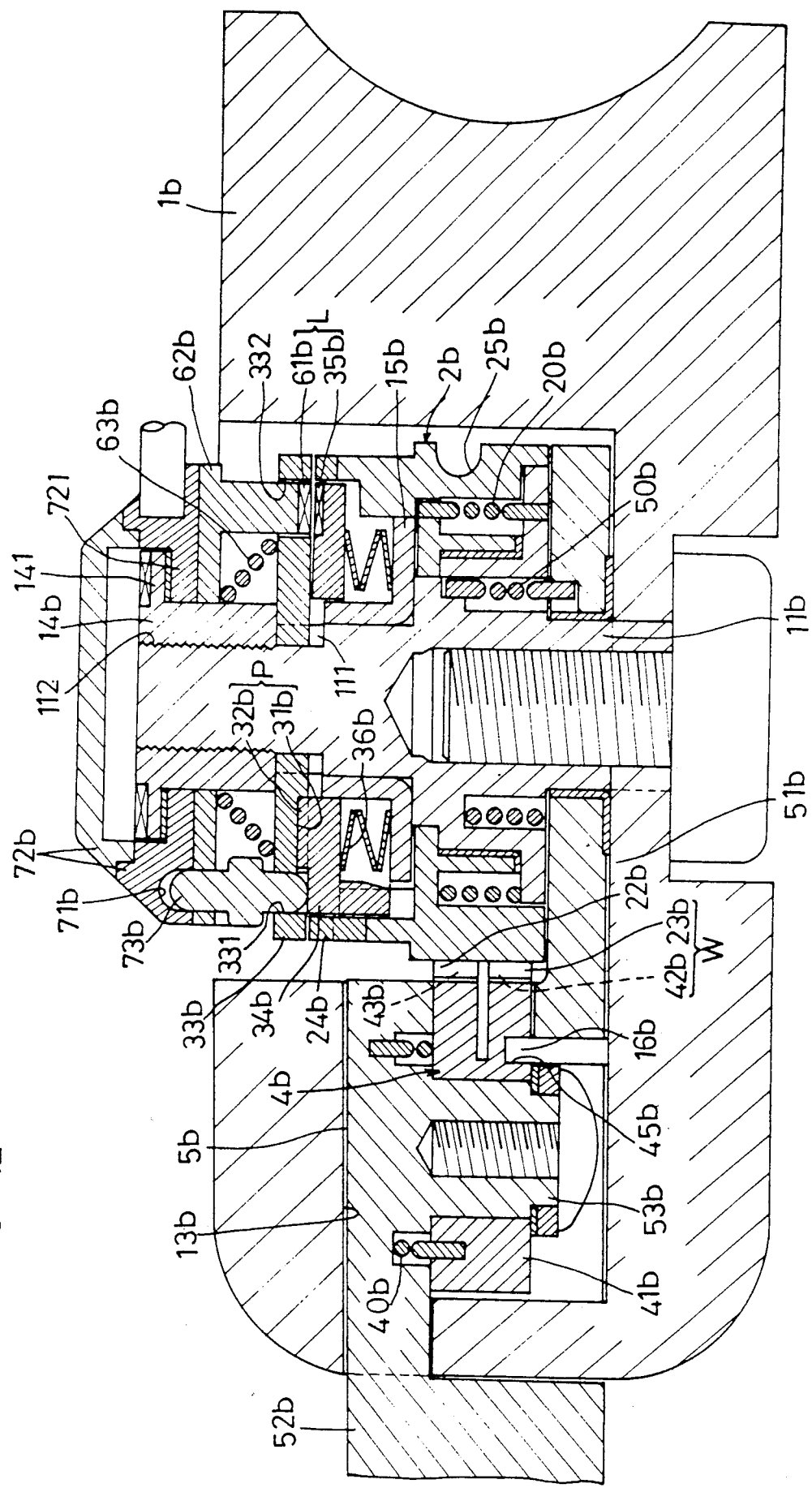
Figure 17:
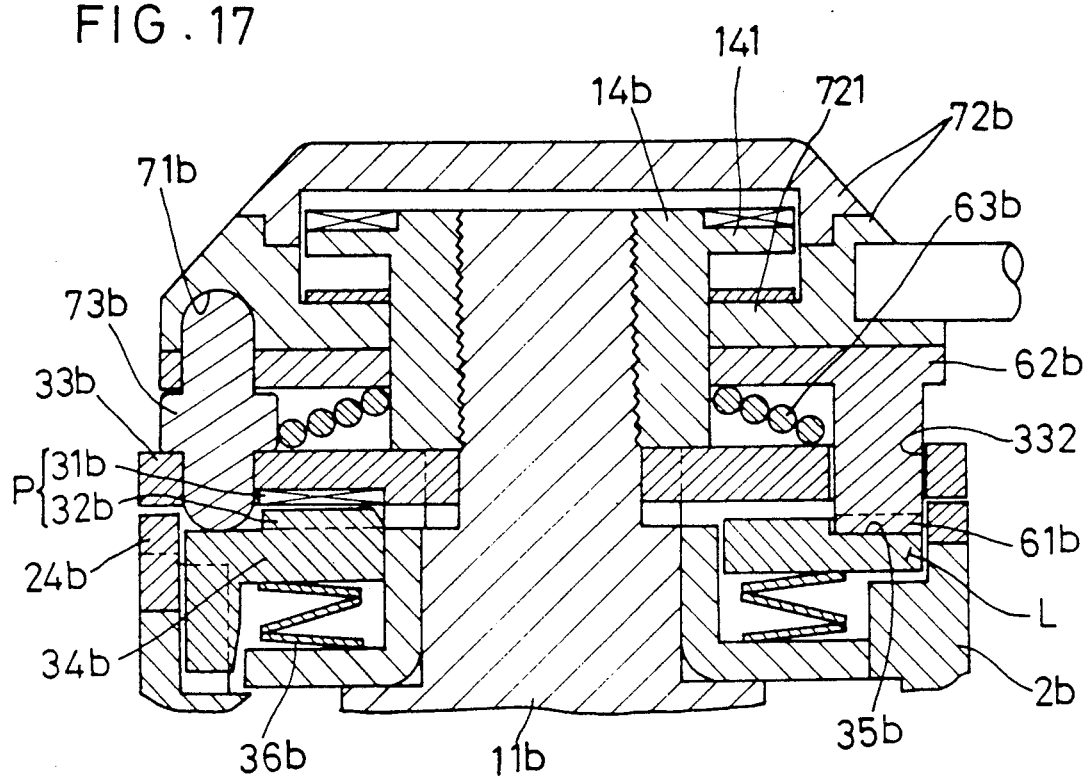
Figure 18:
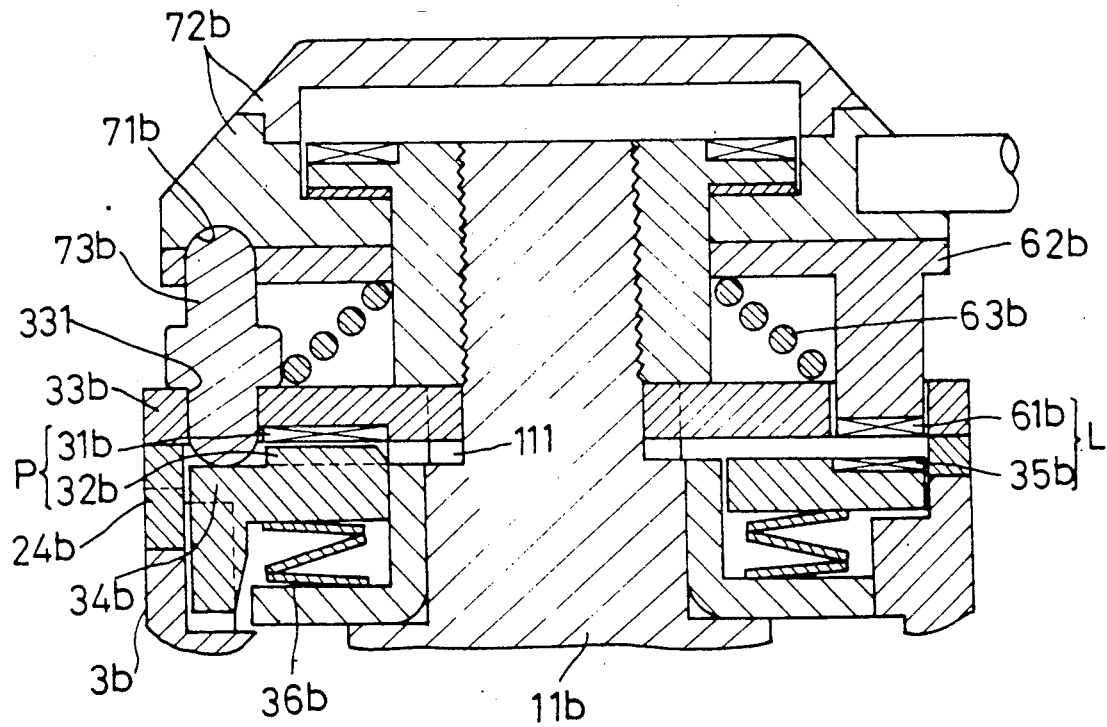

The third embodiment differs from the first and second embodiments mainly in inclusion of an axially operable button type unwind control element. This embodiment further includes a selecting device for positioning the take-up element in a stepless way by friction, in addition to stepwise position thereof by means of the position maintaining mechanism P. In FIGS. 12, 17 and 18 illustrating this embodiment, vertical sections of 90-degree phase difference are shown across a support shaft 11b.

Figure 13:
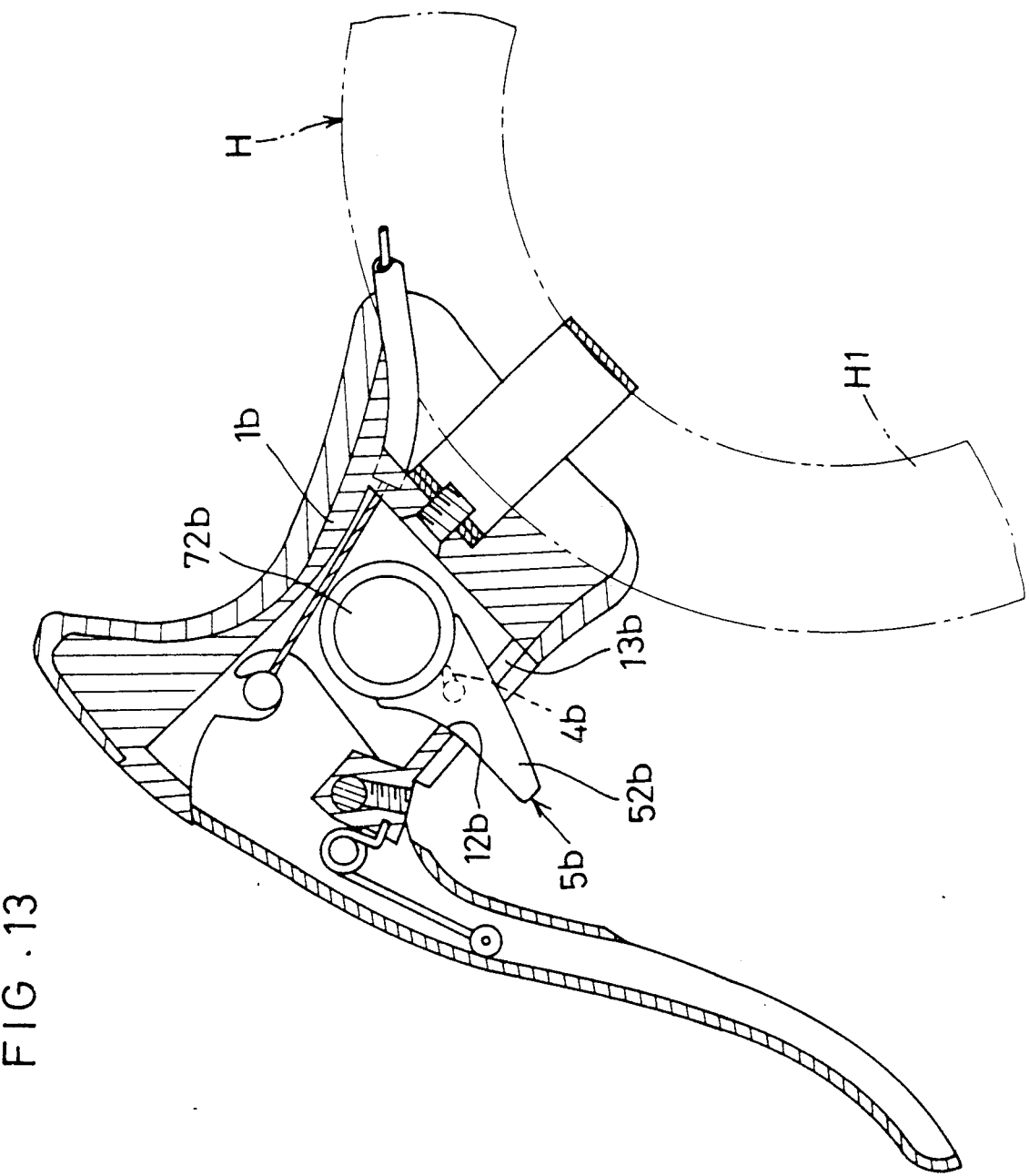
Figure 19:
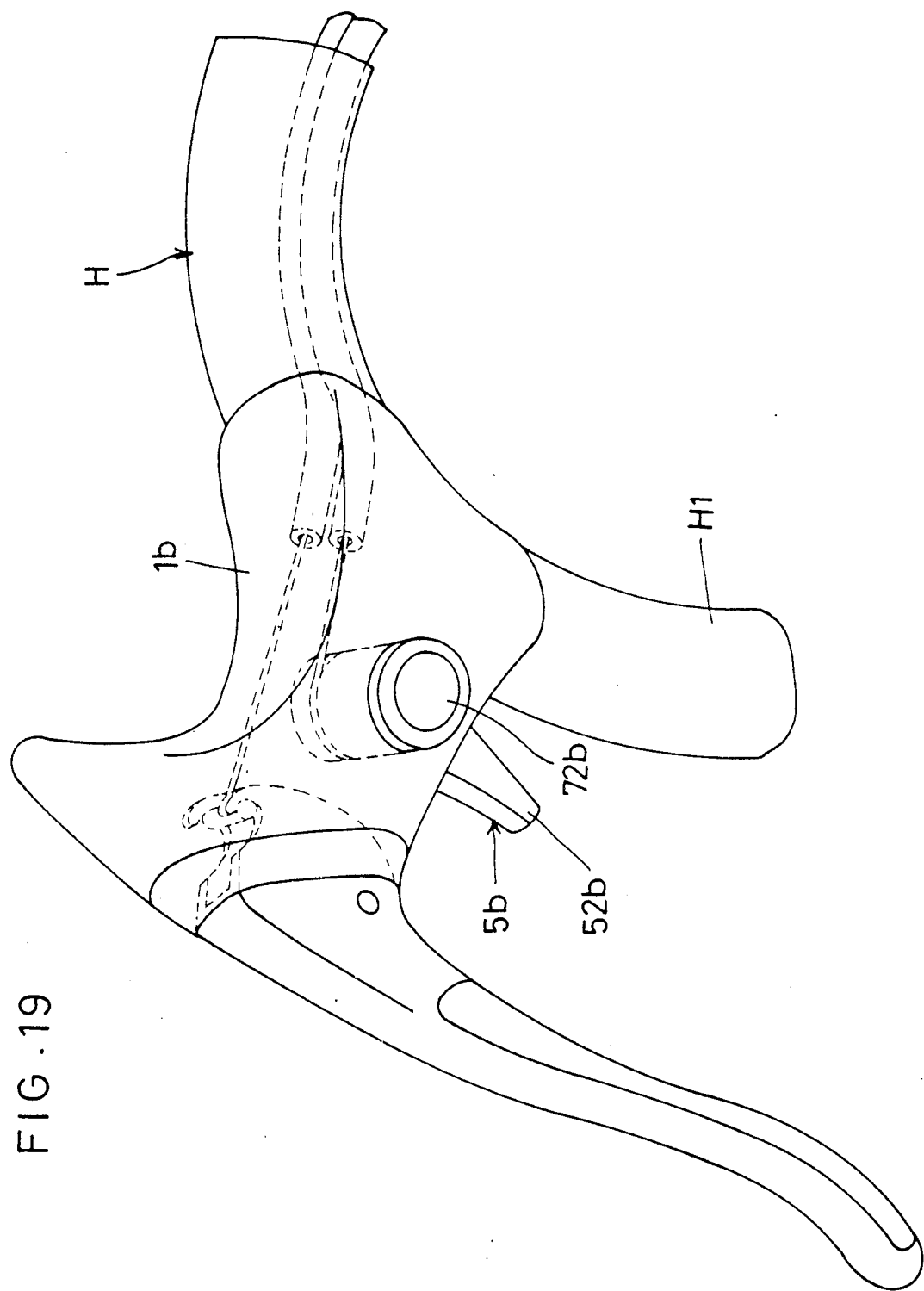

Referring to FIGS. 13 and 19, a fixed member 1b having a box-like shape to facilitate gripping is secured to a dropped handlebar by a securing device such as a band element. In the drawings, The fixed member 1b as secured to a curved portion of the dropped handlebar has an inward wall opening outwardly at an intermediate position. The support shaft 11b extends from an intermediate position of an outward wall of the fixed member 1b toward the opening of the inward wall. The fixed member 1b has a front wall defining a guide opening 13b for guiding a change speed lever 5b to be described later. One end of the guide opening 13b serves as a position setting portion 12b for stopping the change speed lever 5b at an initial position. The fixed member 1b is covered by a flexible material to facilitate gripping.

As shown in FIG. 12, the support shaft 11b supports the change speed lever 5b pivotably mounted adjacent a proximal end thereof and a take-up element 2b rotatably mounted at an intermediate position. The support shaft 11b includes a non-circular fitting portion 111 and a screw portion 112 at a distal end thereof, and a disk-shaped position setting element 33b is mounted on the fitting portion 111 to be movable only axially. A nut 14b having a jaw is meshed with the screw portion 112 for limiting movement of the position setting element 33b.

Figure 20:
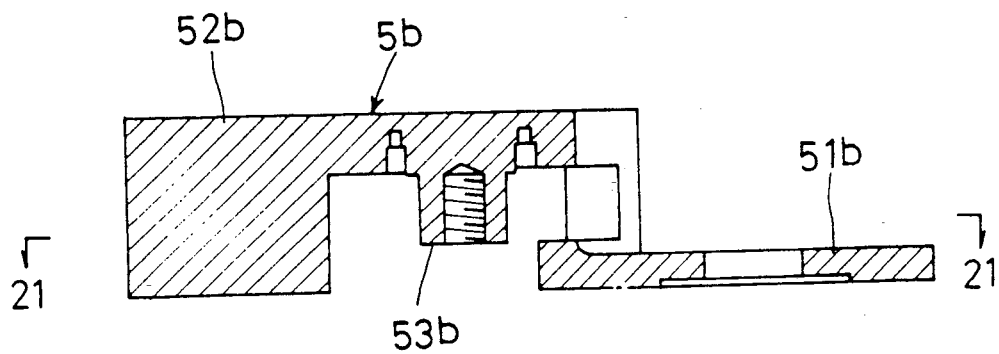
Figure 21:
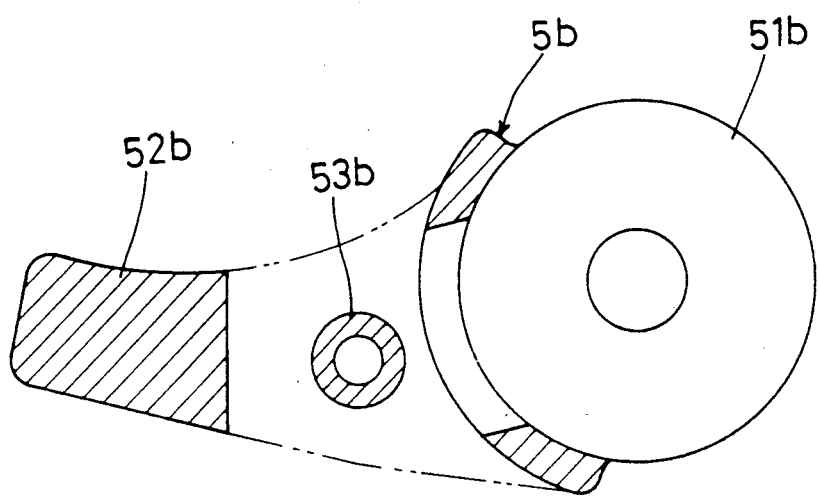
Figure 22:
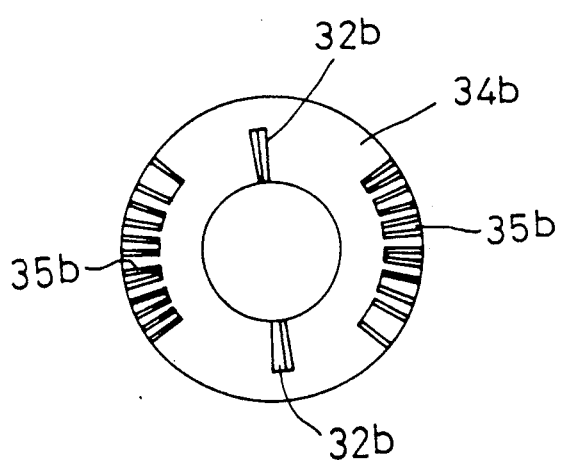

As shown in FIGS. 20 and 21, the change speed lever 5b includes an axial bore for fitting to the support shaft 11b, a base portion 51b having a contact portion for contacting the position setting portion 12b when in the initial position, and a lever portion 52b extending from the base portion 51b through a rising portion bent in a perpendicular direction from one end of the base portion 51b. A pivotal axis 53b parallel to the support shaft 11b is erected at an end of the base portion 51b opposed to the lever portion 52b. The pivotal axis 53b supports a pawl-like transmission element 4b urged in one direction by a spring 40b mounted between the transmission element 4b and change speed lever 5b. These elements, together with feed teeth 22b described later, constitute a one-way mechanism W.

Figure 14:
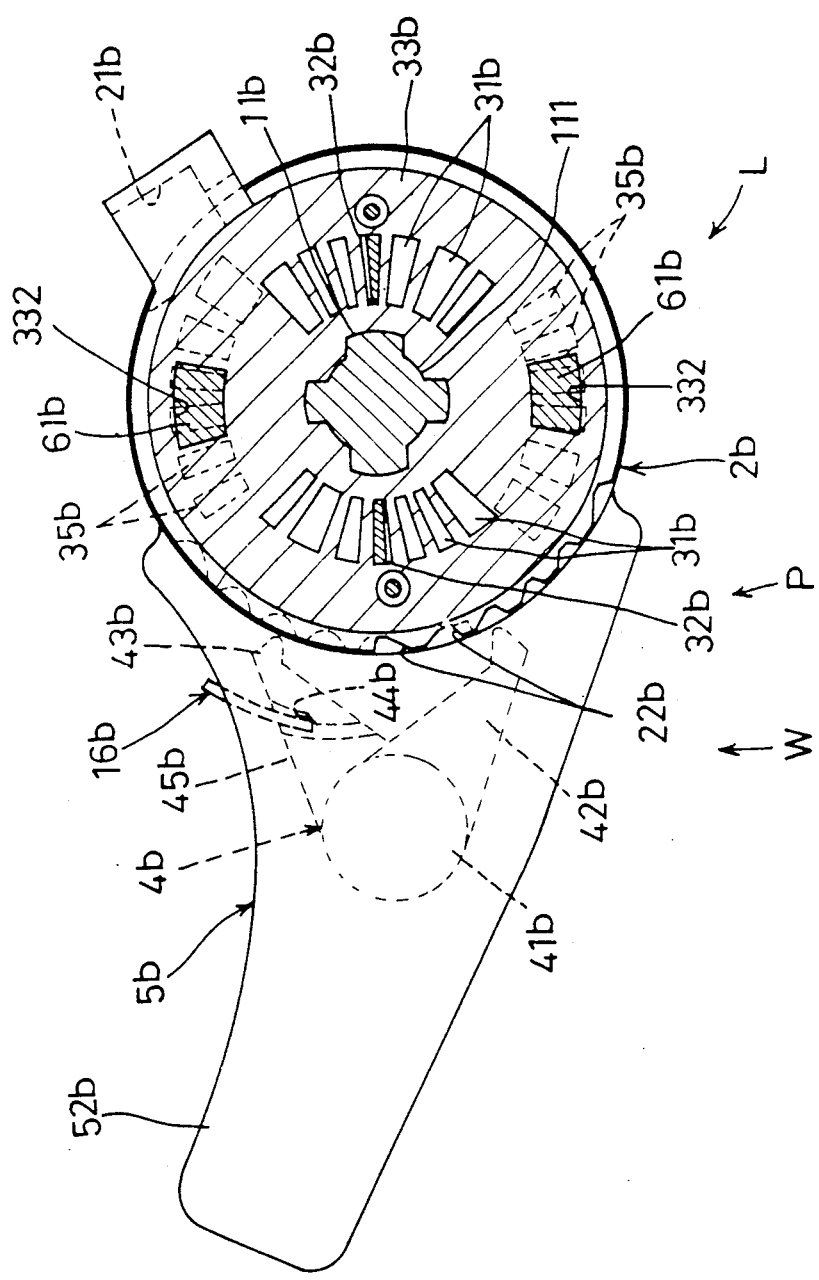

As shown in FIGS. 12 and 14, the take-up element 2b has a cylindrical shape including a wire engaging portion at one side thereof. The take-up element 2b defines a plurality of feed teeth 22b and a plurality of return teeth 23b arranged peripherally of a proximal portion thereof. When the change speed lever 5b is swung in one direction, the feed teeth 22b engage the transmission element 4b and transmit the operating force of the change speed lever 5b. When the change speed lever 5b is swung in the other direction, the return teeth 23b engage the transmission element 4b and transmit the operating force of the change speed lever 5b. The take-up element 2b contains first engaging members 32b inside the distal portion thereof. The take-up element 2b further contains a disk-like holder 34b opposed to the position setting element 33b. The holder 34b is axially movable but not rotatable relative to the take-up element 2b. Each of the first engaging members 32b is engageable with one tooth of each of first engaging portions 31b. Further, the take-up element 2b carries a friction ring 24b mounted on the distal end thereof not to be rotatable relative thereto. The take-up element 2b defines a wire guide groove 25b peripherally of an axially intermediate position thereof to be continuous with the wire engaging portion 21b. This take-up element 2b is urged in a wire-unwinding direction by a return spring 20b.

As shown in FIGS. 12 and 14, the position setting element 33b of the position maintaining mechanism P is disk-shaped and includes a fitting bore for fitting on the fitting portion 111. The position setting element 33b defines two sets of the first engaging portions 31b spaced apart in the circumferential direction on one end surface thereof. Further, the position setting element 33b defines a pair of guide bores 331 and a pair of perforations 332 having a 90-degree phase difference with respect to one another on outer peripheries thereof. Two sets of the first engaging members 32b project from one end surface of the holder 34b. A plurality of limiting teeth 35b are arranged on the same end surface of the holder 34b and at positions angularly displaced from the first engaging members 32b. The limiting teeth 35b are displaced relative to the first engaging portions 31b within one pitch of the latter. Second engaging portions are defined between the limiting teeth 35b. The upper surface of the holder 34b on which the first engaging members 32b and limiting teeth 35b are formed extends perpendicular to the support shaft 11b. A presser spring 36b is mounted between the holder 34b and a bush 15b fitted on the support shaft 11b for urging the holder 34b toward the position setting element 33b. This increases an engaging resistance between the first engaging portions 31b and first engaging members 32b to be greater than the restoring force of the return spring 20b.

Figure 25:
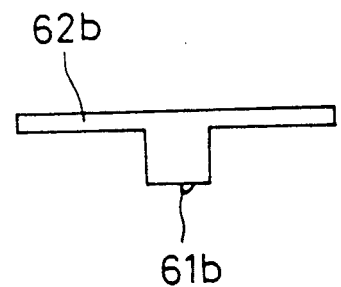

As shown in FIGS. 14 and 25, the rotation limiting mechanism L includes the limiting teeth 35b, and two limiting projections 61b acting as second engaging members engageable with the limiting teeth 35b through the perforations 332. This rotation limiting mechanism L is operable by pressing a release button 72b acting as the unwind control element, to engage the limiting projections 61b with the limiting teeth 35b for preventing the take-up element 2b from returning by an amount exceeding the gap between the first engaging portions 31b. The release button 72b includes an inward jaw opposed to the jaw 141 of the nut 14b. The release button 72b is stopped at an initial position by contact between the inward jaw 721 and jaw 141. A disk-like spacer 62b is mounted between the release button 72b and position setting element 33b. The spacer 62b is urged by a spring 63b in a direction to disengage the limiting projections 61b from the limiting teeth 35b. The release button 72b is axially movable by a predetermined amount relative to the nut 14b. More particularly, when the release button 72b is pressed, the spacer 62b is moved parallel to the support shaft 11b whereby the operating force of the release button 72b is transmitted from the limiting projections 61b and limiting teeth 35b to the holder 34b. Then the holder 34b is moved away from the position setting element 33b to disengage the first engaging members 32b from the first engaging portions 31b. Consequently, the take-up element 2b is allowed to return in the wire-unwinding direction under the restoring force of the return spring 20b.

Figure 15:
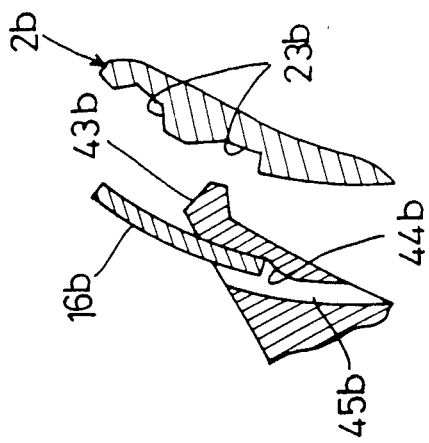
Figure 16:
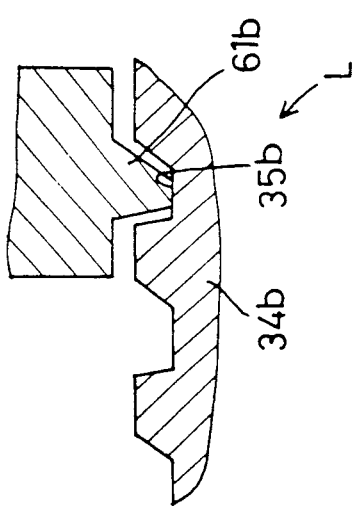

Referring to FIGS. 14 and 15, the transmission element 4b includes a base portion 41b defining a fitting bore, a feed pawl portion 42b extending from the base portion 41b in one direction of swing of the change speed lever 5b, and a return pawl portion 43b extending from the base portion 41b in the other direction thereof. The transmission element 4b is constantly urged in a direction to engage the feed pawl portion 42b with the feed teeth 22b. As shown in FIG. 15, the return pawl portion 43b of the transmission element 4b defines, at an intermediate position thereof, a guide groove 45b having a cam 44b engageable with the control projection 16b extending from the fixed member 1b. When the change speed lever 5b is swung in one direction, the control projection 16b contacts the cam 44b, thereby to forcibly rotate the transmission element 4b clockwise in FIG. 14 against the force of spring 40b, i.e. in a direction to engage the return return pawl portion 43b with the return teeth 23b. In other words, the control projection 16b is in a plate form curved coaxially with the change speed lever 5b, while the cam 44b is displaced circumferentially and outwardly from the axis of swinging movement of the change speed lever 5b. When the change speed lever 5b is swung in the other direction, the control projection 16b slides from a lower surface to a higher surface of the cam 44b, thereby to engage the return pawl section 43b with the return teeth 23b. When the change speed lever 5b returns to the initial position, the control projection 16b is situated at an intermediate position of the cam 44b so that neither pawl portion 42b or 43b prevents rotation of the take-up element 2b.

Figure 23:
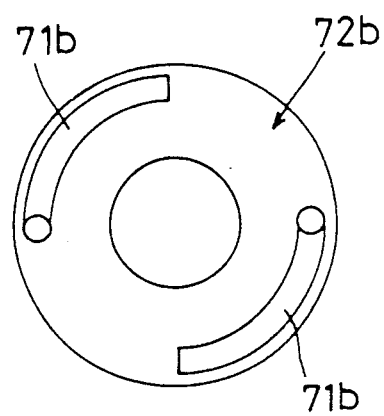
Figure 24:
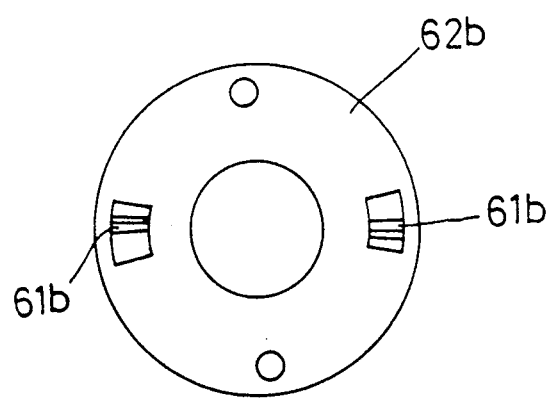

As shown in FIG. 12, the friction device includes the release button 72b having a cam surface 71b as shown in FIG. 23 and rotatably supported peripherally of the nut 41b, a release pin 73b having a large-diameter intermediate portion and extending between the cam surface 71b and the holder 34b through the guide bore 331, and an outer periphery of the position setting element 33b. The outer periphery of the position setting element 33b is opposed to a surface of the friction ring 24b. The release button 72b is rotatable to vary a position of engagement between the release pin 73b and cam surface 71b, thereby to move the release pin 73b parallel to the support shaft 11b. The large diameter portion of the release pin 73b then causes the outer periphery of the position setting element 33b to contact the friction ring 24b.

As shown in FIG. 12, the selecting device includes the release button 72b having the cam surface 71b and the release pin 73b. When the release button 72b is turned, the position of engagement between the release pin 73b and cam surface 71b changes as noted above, thereby moving the release pin 73b to disengage the first engaging members 32b from the first engaging portions 31b. When the release button 72b is rotated further after disengaging the first engaging members 32b from the first engaging portions 31b, the outer periphery of the position setting element 33b is pressed upon the friction ring 24b.

According to the above construction, as shown in FIG. 19, the fixed member 1b is secured to an approximately C-shaped curved section H1 of a dropped handlebar H, the handlebar including a straight bar section extending transversely of the bicycle, and curved sections extending forwardly from opposite ends of the straight bar section, then downwardly and rearwardly. The rider normally grips the fixed member 1b with the tumb placed inwardly and the four fingers placed outwardly. When carrying out a change speed operation, the thumb placed inwardly of the fixed member 1b may easily be moved into contact with the change speed lever 5b lying at the initial position forwardly of the fixed member 1b. By pushing the change speed lever 5b in this state, the lever 5b may be rotated through an appropriate angle downwardly or upwardly from the initial position, to effect change speed in an accelerating or decelerating direction.

An operation of the bicycle control apparatus according to the third embodiment will be described next.

FIGS. 12 and 14 shows an intermediate speed position where the take-up element 2b is rotatable stepwise to be maintained in selected positions with the first engaging members 32b and first engaging portions 31b of the position maintaining mechanism P placed in mutual engagement. The change speed lever 5b is at the initial position under the force of lever spring 50b. When the thumb of the hand gripping the fixed member 1b is placed on the lever portion of the fixed member 1b and the latter is swung forward or counterclockwise from the position shown in FIG. 14, the feed pawl portion 42b of transmission element 4b engages one of the feed teeth 22b of take-up element 2b to transmit the operating force of change speed lever 5b to take-up element 2b. Then the take-up element 2b rotates forward or counterclockwise to pull the control wire. A one-step lower speed is provided when the forward swing of the change speed lever 5b reaches a one-pitch stroke of the engaging portions 31b, and a two-step lower speed is provided when the forward swing reaches a two-pitch stroke. A single operation by the thumb can effect change speed stepwise or straight from a higher speed down to a third lower speed. For a fourth and lower speeds, the change speed lever 5b is once returned to the initial position and swung forward again to produce a lower speed step by step or to change a speed plural steps lower in one effort. When a desired low speed is reached, the first engaging members 32b are placed in engagement with the first engaging portions 31b to lock the take-up element 2b against backward rotation, thereby positively maintaining the desired low speed.

When the change speed lever 5b is released after the above change speed operation, the lever 5b returns under the force of lever spring 50b, and stops at the initial position by contact with the setter 12b, to be ready for a next operation.

Where a total of five or six speeds are provided, a shift is readily made from a higher speed to a lower speed by pushing the change speed lever 5b twice with the thumb.

When causing a shift from a lower speed to a higher speed, the thumb of the hand holding the fixed member 1b is placed on the top of the release button 72b in the initial position and the button 72b is just pushed. Then the spacer 62b is moved against the force of spring 63b, whereby the limiting projections 61b of the rotation limiting mechanism L advance between the limiting teeth 35b. As the release button 72b is pressed further to push the limiting projections 61b, the holder 34b is moved against the presser spring 36b. As a result, as shown in FIG. 17, the first engaging members 32b become disengaged from the first engaging portions 31b, and the take-up element 2b rotates backward by a predetermined amount under the force of return spring 20b. Since, at this time, the limiting teeth 35b are displaced circumferentially within one pitch of the first engaging portions 31b, the engagement between limiting teeth 35b and limiting projections 61b limits the amount of return rotation of the take-up element 2b under the force of return spring 20b. Consequently, the take-up elememt 2b makes a return within the range less than one pitch of the first engaging portions 31b.

When freed from the pressing operation, the release button 72b returns under the force of spring 63b, with the limiting projections 61b disengaging from the limiting teeth 35b. At the same time, the holder 34b makes a return under the restoring force of presser spring 36b. The take-up element 2b returns under the force of returns spring 20b by the remaining pitch of the one pitch, whereby the first engaging members 32b engage one step higher speed positions of the first engaging portions 31b. This engagement prevents the take-up element 2b from returning under the force of return spring 20b, thereby maintaining the intended higher speed position. The release button 72b having returned stops at the initial position through the contact between the inward jaw 721 and the jaw of nut 14b, to be ready for a next operation.

When the release button 72b having stopped at the initial position is pressed again, the first engaging members 32b disengage from the first engaging portions 31b after the limiting projections 61b move downward to a position fully engageable with the limiting teeth 35b. The take-up element 2b returns under the force of return spring 20b to further relax the wire to enable a change speed to a still higher speed. By releasing the release button 72b, the first engaging members 32b engage next lower speed positions of the first engaging portions 31b to maintain the take-up element 2b in position. The release button 72b having returns similarly stands still. The shift from low speed to high speed always enables a stepwise change speed in the return direction since the amount of return movement of the take-up element 2b is limited by the limiting projections 61b engaging the limiting teeth 35b for every pitch of the first engaging portions 31b.

For effecting a change speed operation by constantly applying a resistance to the rotation of take-up element 2b, the release button 72b is turned first. As shown in FIG. 18, with the rotation of the release button 72b, the position of engagement between the release pin 73b and cam surface 71b shifts successively, and the release pin 73b and holder 34b move to disengage the first engaging members 32b from the first engaging portions 31b. At the same time, the large diameter portion of release pin 73b contacts a peripheral surface of the position setting element 33b to move the latter. Then, as shown in FIG. 17, a peripheral undersurface of the position setting element 33b is pressed against the friction ring 24b, thereby producing a predetermined friction between the position setting element 33b and friction ring 24b.

When the change speed lever 5b is swung in one direction, the feed pawl portion 42b of transmission element 4b engages the feed teeth 22b of take-up element 2b to effect change speed in the forward direction. When the change speed lever 5b is swung in the other direction, the control projection 16b of fixed member 1b contacts the cam 44b of transmission element 4b. The transmission element 4b rotates against the force of spring 40b in a direction to engage the return pawl portion 43b with the return teeth 23b. A change speed in the return direction is effected through the engagement between return pawl portions 43b and return teeth 23b.

For switching from the friction mode to the mode involving the position maintaining mechanism, the release button 72b may just be turned in the opposite direction. With this rotation of release button 72b, the presser spring 36b returns the holder 34b, position setting element 22b and release pin 73b, thereby engaging the first engaging members 32b with the first engaging portions 31b.

According to the third embodiment as described above, a pressing operation of the release button 72b always causes the limiting projections 61b of the rotation limiting mechanism L to advance between the limiting teeth 35b before the first engaging members 32b disengage from the first engaging portions 31b of the position maintaining mechanism P. Consequently, even if the position maintaining mechanism P and rotation limiting mechanism L have low dimensional precision, the rotation limiting mechanism L can always limit the rotation in the wire-unwinding direction of the take-up element 2b, whereby a shift may be effected stepwise in the unwinding direction.

Various modifications of the present invention are listed hereunder.

I. In the first and second embodiments, the second engaging member is urged by a spring away from the second engaging portion. This urging direction may be reversed. More particularly, as shown in FIG. 26, the second engaging member 62C may constantly be urged by a spring 63 toward the second engaging portion 61, with the rotation limiting mechanism L maintained inoperable by contact between a second cam 72C and second cam follower 64. With an operation of release lever 7, the second cam 72C is retracted to render the rotation limiting mechanism L operable.

II. In all of the described embodiments, the take-up element is returned by the return spring. Alternatively, the return spring of the deraileur may be utilized to return the take-up element. Thus, the return spring mounted between the take-up element and fixed member is dispensable.

III. In all of the embodiments, the first and second engaging members are pawl-shaped, and the first and second engaging portions each comprise a plurality of teeth. Such relationship may be reversed completely. In the third embodiment, the position setting element 33 of the position maintaining mechanism is supported by the fixed member 1, with the first engaging members 32 following the rotation of take-up element 2b. This may also be reversed.

IV. In the third embodiment, the first engaging portions 31b and first engaging members 32b may be opposed radially of the support shaft 11b instead of being opposed axially thereof. In this case, the fist engaging portions 31b may be arranged peripherally of the take-up element 2b, with the first engaging members having a pawl-like shape and pivoted to the fixed member 1b. The limiting teeth 35b of the rotation limiting mechanism L are arranged peripherally, with the limiting projections 61b arranged operable radially outwardly of the take-up element 2b.

V. The first engaging member in the third embodiment shown in FIG. 25 may be formed separately from the holder 34b and employ a ball. The constructions of the position maintaining mechanism P and rotation limiting mechanism L are not limited to the illustrated examples. Also the friction device and selecting device are not limited to the illustrated examples.

VI. The control apparatus according to the third embodiment may be secured to other types of handlebars other than the dropped handlebar, such as a flat handlebar, or to other positions of a bicycle, such as a top tube of a bicycle frame. When the apparatus is secured to a handlebar, the change speed lever 5b and release device may be arranged at initial positions operable from a gripping position of the handlebar. Similarly, the control apparatus according to the first and second embodiments may be secured to various positions of a bicycle.

VII. The limiting projections 61b may be omitted from the third embodiment. In this case, the amount of engagement between the first engaging members 32b and first engaging portions 31b may be controlled through control element 72b, to rotate the take-up element 2b step by step or for a plurality of steps in one effort for shifting from low speed to high speed.

VIII. In all of the described embodiments, the one-way mechanism W is provided between the change speed lever 4, 4a or 5b and take-up element 2, 2a or 2b. The one-way mechanism W may be omitted, with the change speed lever 4, 4a or 5b and take-up element 2, 2a or 2b arranged rotatable together.

What is claimed is:

1. A bicycle speed control apparatus having a take-up element, that is urged in a cable winding direction, for winding up a speed control cable, comprising;
   a fixed member,
   the take-up element being rotatably supported by said fixed member,
   a wind-up control member operable to effect a change speed by rotating said take-up element against the urging force in the unwinding direction for winding up the cable,
   a position maintaining mechanism including a first engaging member and a first engaging portion engageable stepwise for maintaining said take-up element in a selected position,
   a rotation limiting mechanism including a second engaging member and a second engaging portion engageable stepwise for limiting rotation in the unwinding direction of said take-up element to a predetermined amount, and
   an unwind control member operable to effect a change speed by actuating said rotation limiting mechanism and releasing said take-up element from said position maintaining mechanism for unwinding the cable,
   characterized in that said first engaging member (32, 32a, 32b) of the position maintaining mechanism (P) and said second engaging member (62, 62a, 61b) of the rotation limiting mechanism (L) are movable independently of each other.

2. A bicycle speed control apparatus as claimed in claim 1, characterized in that said unwind control member (7, 7a, 5b) is operable to disengage said position maintaining mechanism (P) after moving said second engaging member (62, 62a, 61b) to a position engageable with said second engaging portion (61, 61a, 35b) of the rotation limiting mechanism (L).

3. A bicycle speed control apparatus as claimed in claim 2, characterized in that said rotation limiting mechanism (L) is operable to limit the rotation in said unwinding direction of said take-up element (2, 2a, 2b) to less than one pitch of the stepwise engagement of said position maintaining mechanism (P).

4. A bicycle speed control apparatus as claimed in claim 3, characterized in that said first and second engaging members (32, 32a, 62, 62a) comprise pawls, and said first and second engaging portions (31, 31a, 61, 61a) each comprise a plurality of teeth associated with said take-up element (2, 2a).

5. A bicycle speed control apparatus as claimed in claim 4, further comprising a first and a second camming devices (C1, C2) operatively connected to said unwind control member (7, 7a), said first and second camming devices (C1, C2) being operable with an operation of said unwind control member (7, 7a) to separate and disengage said first engaging member (32, 32a) from said first engaging portion (31, 31a) of said position maintaining mechanism (P) after moving said second engaging member (62, 62a) to the position engageable with said second engaging portion (61, 61a) of the rotation limiting mechanism (L).

6. A bicycle speed control apparatus as claimed in claim 5 characterized in that said first and second camming devices (C1, C2) include drive elements (71, 72, 74, 75) provided on said unwind control member (7, 7a).

7. A bicycle speed control apparatus as claimed in claim 6, characterized in that said wind-up control member (4, 4a) and said unwind control member (7, 7a) comprise levers pivoted to said fixed member (1, 1a) and returned to respective initial positions after each operation, said wind-up control member (4, 4a) including a one-way mechanism W operable with an operation of said wind-up control member (4, 4a) to rotate said take-up element (2, 2a) only in the winding direction.

8. A bicycle speed control apparatus as claimed in claim 7, characterized in that said wind-up control member (4, 4a) and said unwind control member (7, 7a) are pivotally supported on a pivotal axis of said take-up element (2, 2a).

9. A bicycle speed control apparatus as claimed in claim 8, characterized in that said first and second engaging members (32m 62) are pivotally connected to said fixed member (1) through axes (35, 65) extending substantially parallel to said pivotal axis (11) of said take-up element (2), said first and second engaging portions (31, 61) being provided on inside walls of a cylindrical portion extending from said take-up element (2) along said pivotal axis.

10. A bicycle speed control apparatus as claimed in claim 9, characterized in that said drive elements (71, 72) of said first and second camming devices (C1, C2) comprise cams provided on said unwind control member (7) and around a pivotal support thereof, said camming devices including followers (34, 64) projecting from said first and second engaging members (32, 62).

11. A bicycle speed control apparatus as claimed in claim 10, further comprising a third camming device (C3) operable with an operation of said unwind control member (7) to break the operative connection between said one-way mechanism (W) and said take-up element (2).

12. A bicycle speed control apparatus as claimed in claim 11, characterized in that said first engaging member (32) is constantly urged toward said first engaging portion (31), and said second engaging member (62) is constantly urged away from said second engaging portion (61).

13. A bicycle speed control apparatus as claimed in claim 8, characterized in that said first engaging member (32a) is pivotally connected to said fixed member (1a) through a pivotal axis (15a) extending substantially parallel to said pivotal axis (11a) of said take-up element (2a), said first engaging portion (31a) being provided peripherally of said take-up element (2a), said rotation limiting mechanism (L) further including a rotation limiting element (8) axially movably and unrotatably mounted on said pivotal axis (11a) of said take-up element (2a), said second engaging member (62a) and said second engaging portion (61a) being provided on opposed surfaces of said rotation limiting element (8) and said take-up element (2a), respectively.

14. A bicycle speed control apparatus as claimed in claim 13, characterized in that said drive element (74) of said first camming device (C1) comprises a cam operable with an operation of said unwind control member (7a) to drive away said first engaging member (32a), and said drive element (75) of said second camming device (C2) comprises a cam operable with the operation of said unwind control member (7a) to move said rotation limiting element (8) along said pivotal axis of said take-up element (2a).

15. A bicycle speed control apparatus as claimed in claim 14, further comprising a third camming device (C3) operable with the operation of said unwind control member (7a) to break the operative connection between said one-way mechanism (W) and said take-up element (2a).

16. A bicycle speed control apparatus as claimed in claim 15, characterized in that said first engaging member (32a) is constantly urged toward said first engaging portion (31a), and said second engaging member (62a) is constantly urged away from said second engaging portion (61a).

* * * * *

UNITED STATES PATENT AND TRADEMARK OFFICE
CERTIFICATE OF CORRECTION

PATENT NO. : 5,044,213

DATED : September 3, 1991

INVENTOR(S) : Masashi Nagano

It is certified that error appears in the above-identified patent and that said Letters Patent is hereby corrected as shown below:

Column 1, line 34, "in a cable winding direction" should read --in a cable unwinding direction--.

Column 15, line 43, "in a cable winding direction" should read --in a cable unwinding direction--.

Signed and Sealed this

Twenty-fifth Day of May, 1993

Attest:

MICHAEL K. KIRK

*Attesting Officer*      *Acting Commissioner of Patents and Trademarks*